United States Patent
Overcash et al.

(10) Patent No.: US 9,294,404 B2
(45) Date of Patent: Mar. 22, 2016

(54) MODEM MODE CONTROL BASED ON FLOW RANKING

(71) Applicant: CISCO TECHNOLOGY, INC., San Jose, CA (US)

(72) Inventors: Michael P. Overcash, Lawrenceville, GA (US); Altan J. Stalker, Lawrenceville, GA (US); Tejalkumar G. Patel, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 158 days.

(21) Appl. No.: 14/155,955

(22) Filed: Jan. 15, 2014

(65) Prior Publication Data

US 2015/0200855 A1 Jul. 16, 2015

(51) Int. Cl.
*H04L 12/801* (2013.01)

(52) U.S. Cl.
CPC ............... *H04L 47/12* (2013.01); *H04L 47/11* (2013.01)

(58) Field of Classification Search
None
See application file for complete search history.

(56) References Cited

U.S. PATENT DOCUMENTS

| | | |
|---|---|---|
| 7,836,274 B2 | 11/2010 | Bestler |
| 2009/0213871 A1* | 8/2009 | Carlson et al. ............... 370/462 |
| 2010/0131971 A1* | 5/2010 | Hegglin et al. ................ 725/25 |
| 2010/0226390 A1 | 9/2010 | Yan et al. |
| 2013/0191663 A1 | 7/2013 | Overcash et al. |
| 2015/0200855 A1* | 7/2015 | Overcash et al. ............. 370/235 |

OTHER PUBLICATIONS

K. Nichols, et al., "Controlled Delay Active Queue Management draft-nichols-tsvwg-codel-01", http://tools.ietf.org/html/draft-nichols-tsvwg-codel-01; Feb. 24, 2013, pp. 1-18.
Zhi Li, et al., "Probe and Adapt: Rate Adaption for HTTP Video Streaming at Scale", http://arxiv.org/pdf/1305.0510.pdf, Jul. 7, 2013, 15 pp.
Rong Pan, et al., PIE: A Lightweight Scheme to Address the Bufferbloat Problem; CISCO Presentation, Mar. 12, 2013.

* cited by examiner

*Primary Examiner* — Omar Ghowrwal
(74) *Attorney, Agent, or Firm* — Merchant & Gould P.C.

(57) ABSTRACT

A system can include a precondition detector configured to determine that the system has network congestion at a network link. The system can also include a flow ranking controller that includes a flow excluder configured to apply exclusion criteria to a plurality of data flows associated with respective modems that are operating in a lower bandwidth mode to generate a list of non-excluded data flows. The flow ranking controller can also include a flow tester configured to apply flow tests to the non-excluded data flows to determine which of the respective modems is likely to benefit from being switched to a higher bandwidth mode.

18 Claims, 4 Drawing Sheets

FIG. 6

MODEM MODE CONTROL BASED ON FLOW RANKING

TECHNICAL FIELD

This disclosure relates to modem mode control based on ranking of data flows.

BACKGROUND

An access router is a piece of equipment, typically located in a cable company's headend or at a hub, which can be employed to provide high speed data services, such as cable Internet and/or Voice over Internet Protocol (VoIP) to cable subscribers. In order to provide high speed data services, a cable company can connect its headend to the Internet via very high capacity data links to a network service provider. On the subscriber side of the headend, the access router enables the communication with subscribers' modems to provide network access.

DESCRIPTION OF EXAMPLE EMBODIMENTS

Overview

In one example, a system can include a precondition detector configured to detect congestion at a network link. The system can also include a flow ranking controller to operate in response to detecting the congestion at the network link. The flow ranking controller can include a flow excluder configured to apply exclusion criteria to a plurality of data flows through the network link associated with respective modems that are operating in a lower bandwidth mode and to generate a list of non-excluded data flows. The flow tester can be configured to apply flow tests to the non-excluded data flows to determine which of the respective modems is likely to benefit from being switched from a lower bandwidth mode to a higher bandwidth mode.

In another example, a system can include a first network interface connected to a wide area network via a broadband connection and a second network interface connected to a plurality of modems. The system can also include a forwarder configured to allocate bandwidth to each of the plurality of modems. A lower bandwidth subset (e.g., a narrowband subset) of the plurality of modems can operate in a lower bandwidth mode. The system can include a precondition detector configured to detect network congestion in at least one of the first network interface and the second network interface. The system can further include a flow ranking controller configured to rank a plurality of data flows in response to the detection of the network congestion. The flow ranking controller can include a flow excluder configured to apply exclusion criteria to the plurality of data flows associated with respective modems of the lower bandwidth subset of the plurality of modem to generate a list of non-excluded data flows. The flow ranking controller can also include a flow tester configured to apply at least one flow test to the non-excluded data flows to determine which of the respective modems is likely to benefit from being switched to a higher bandwidth mode. The flow ranking controller can further include a mode controller to provide a switch list that includes a list of modems in the lower bandwidth subset of the plurality of modems that have been determined to likely benefit from being switched to the higher bandwidth mode. The forwarder can be configured to command modems to switch to the higher bandwidth mode based on the switch list.

In yet another example, a method can include detecting network congestion in a termination system. The method can also include applying exclusion criteria to a plurality of data flows to generate a list of non-excluded data flows in response to detecting the network congestion. Each of the plurality of data flows can be associated with a respective modem operating in a lower bandwidth mode. The method can further include applying flow tests to each of the non-excluded data flows to determine which of the plurality of modems operating in the lower bandwidth mode is likely to benefit from being switched to the a higher bandwidth mode.

Example Embodiments

This disclosure relates to a router system, such as an access router or other similar system (e.g., digital subscriber line access multiplexer (DSLAM), a cable modem termination service (CMTS) or the like). The system can be coupled to provide a broadband connection with the Internet. The system can be configured to allocate bandwidth of the broadband connection to a plurality of downstream modems (e.g., cable modems or other terminal adapters). One or more of the modems can be operating in a lower bandwidth mode, thereby preventing such modems from being allocated additional channels of bandwidth. In times of network congestion, a flow ranking controller can determine which of these modems is likely to benefit from being switched from a lower bandwidth mode (e.g., a narrowband mode) to a higher bandwidth mode (e.g., a wideband or broadband mode). As used herein, network congestion refers to a situation when a link or node is carrying so much data that its quality of service (QoS) deteriorates below some threshold. The flow ranking controller can exclude flows associated with particular modems operating in the lower bandwidth mode from being considered. The flow ranking controller can also apply flow tests to the non-excluded data flows to determine which of the modems is likely to benefit from being switched to a higher bandwidth mode. Upon such a determination, some (or all) of the modems operating in the lower bandwidth mode can be switched to the higher bandwidth mode. Such a selective switching of bandwidth modes can reduce energy costs and efficiently allocate a finite amount of bandwidth.

Figure 1:
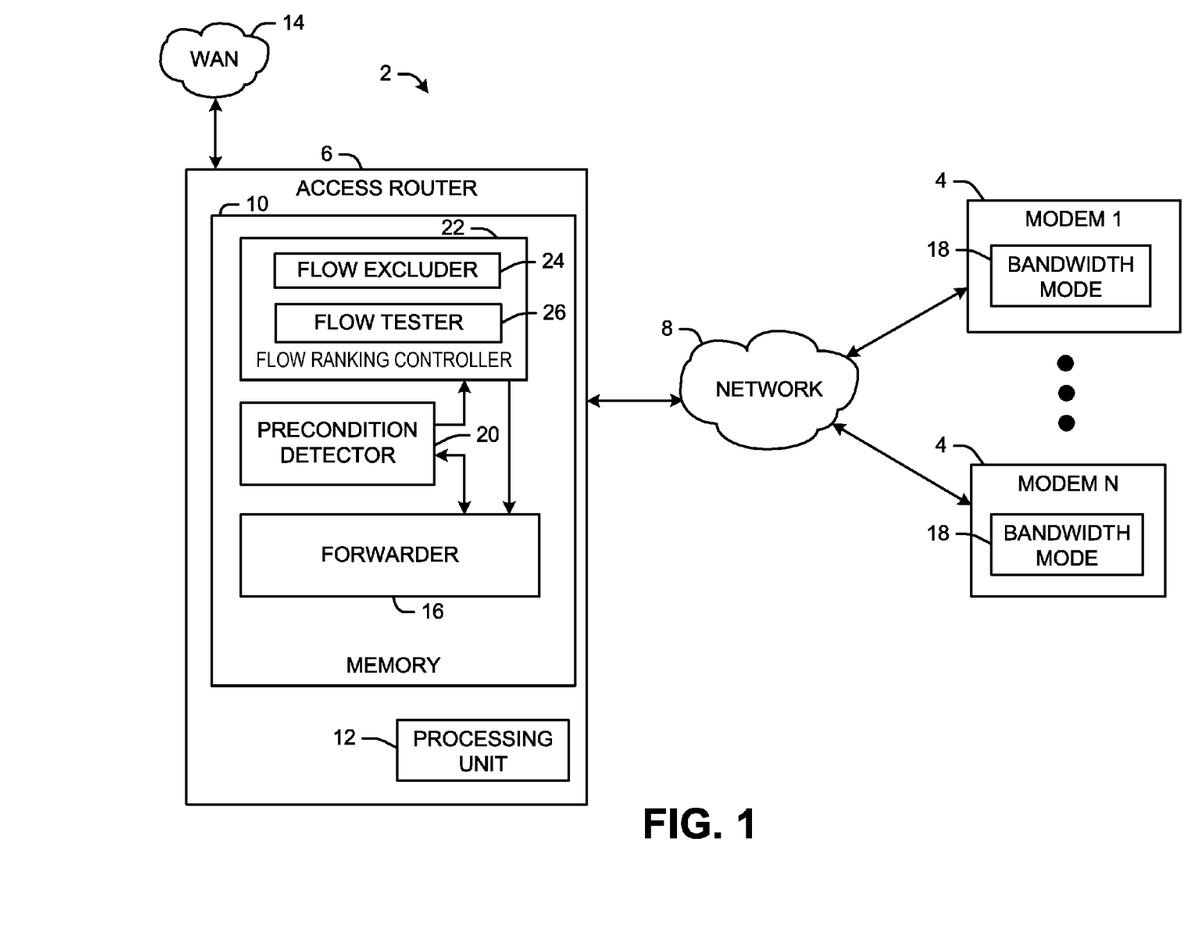
FIG. 1 illustrates an example of a system for controlling a bandwidth mode of modems.

FIG. 1 illustrates an example of a system 2 for controlling a bandwidth mode of N number of modems 4, wherein N is an integer greater than or equal to one. Each of the modems 4 can be coupled to a home network or an office network (e.g., a local area network (LAN)) or directly to one or more devices. Each of the modems 4 can communicate with an access router 6 (or similar system) that can provide data over a network 8 (e.g., a downstream network) to each of the N number of modems 4. As used herein, for example, each modem 4 can be a cable modem or other form of terminal adapter to provide for communications with the router system that affords network access for each respective modem 4. As disclosed herein, in some examples, each of the modems 4 can be cable modems and the access router 6 can be a cable modem termination system (CMTS). Thus, in such an example, the system 2, including the access router and network 8, can provide a cable access network for connecting users of the respective modems 4 with a wide area network (e.g., the Internet) 14.

The access router 6 can include a memory 10 for storing machine readable instructions. The access router 6 can also include a processing unit 12 (e.g., a processor core) that can be configured to access the memory 10 and execute machine readable instructions. The access router 6 can be a rack system 2 that can receive individual modules. Additionally or alternatively, the access router 6 can have some or all of the modules integrated together. The access router 6 can include a connection to a wide area network (WAN) 14, such as the Internet. The connection to the WAN 14 can be a broadband, multichannel connection, such as a 1 Gigabit per second (Gbps) upstream and 1 Gbps downstream connection. In other examples, the broadband connection can have more or less bandwidth. The access router 6 can include a forwarder 16 that can be configured to allocate portions of the broadband connection to the N number of modems 4 via the network 8. Each such portion can be referred to as a channel (e.g., a data channel) of an access network. In some examples, the forwarder 16 can allocate channels of bandwidth to the N number of modems 4 via the network 8. The forwarder 16 can be implemented, for example, as an edge router, such as a quadrature amplitude modulation (QAM) edge router.

As one example, in the situation where the broadband connection is a 1 Gbps connection (e.g., both upstream and downstream), each channel can have a bandwidth of about 10 Megabits per second (Mbps). In such an example, the forwarder 16 can be configured to allocate 200 different upstream channels and 200 different downstream channels among the N number of modems 4. That is, the forwarder 16 can be configured to allocate more upstream and downstream bandwidth to the modems 4 than the available bandwidth at the broadband connection. In the present example, modem 1 may be assigned 8 downstream channels and 3 upstream channels. In such a situation, the modem 1 can be considered to have an "8×3 connection", wherein the '8' indicates the number of downstream channels, and the '3' indicates the number of upstream channels that are assigned to modem 1. Moreover, the forwarder 16 can bond the channels assigned to the modem 1, such that the modem 1 can have a maximum downstream throughput of 800 Mbps and a maximum upstream throughput of 300 Mbps over the 8×3 connection. In a similar manner, the other modem 2 could have a 5×8 connection. As load requirements change, the forwarder 16 can continuously update the assignment of the channels to the N number of modems 4.

The access router (e.g., a CMTS) 6 and the N number of modems 4 can be configured, in some examples, to comply with one of the Data Over Cable Service Interface Specification (DOCSIS) standards, such as DOCSIS 3.0. Accordingly, each of the N number of modems 4 can have a bandwidth mode 18. The bandwidth mode 18 of a given modem 4 can define a bandwidth operation mode for the given modem 4. The bandwidth mode 18 can provide a narrowband mode or a wideband (e.g. broadband) mode for each respective modem 4. In some examples, the narrowband mode can be the DOCSIS Light Sleep ("DLS") mode. In some examples, the narrowband mode can be a "power savings" bandwidth mode, and the wideband can be a "full power" bandwidth mode. While the given modem 4 is in wideband mode the given modem 4 can have any number of bonded channels assigned to the given modem 4. Conversely, in the narrowband mode, the given modem 4 can be assigned a more limiting channel allocation, such as a 1×1 connection to limit the bandwidth allocated to the given modem 4 and to conserve power.

For purposes of simplification of explanation, the terms "narrowband mode" and "wideband mode" are employed in many examples. However, these are not the only examples of bandwidth modes that can be employed at each modem 4. In some examples, there can be a spectrum of bandwidth modes, wherein each level of bandwidth mode in the spectrum of bandwidth modes can correspond to a specific number of channels and/or a specific amount of bandwidth being allocated to an associated modem 4. In such a situation, the term "higher bandwidth mode" and "lower bandwidth mode" can be employed to characterize a relative amount of bandwidth employable by a modem 4. That is, a given modem 4 that operates in a higher bandwidth mode can have a greater amount of channels, carriers, sub-carries and/or spectrum allocated thereto than another modem 4 that is operating in a lower bandwidth mode.

In one example (hereinafter, "the given example"), upon an initial startup, a given modem 4 can be operating in the wideband mode. After a period of time (e.g., about 10-60 minutes) with activity levels below an entry threshold value (e.g., 2 Mbps), the given modem 4 can send a request to the forwarder 16 for a mode change to the narrowband mode. The forwarder 16 can respond with a command that instructs the given modem 4 to change modes from the wideband mode to the narrowband mode (or from a lower bandwidth mode to a higher bandwidth mode). The command could be, for example, a dynamic bonding change (DBC) command. Conversely, after a period of time (e.g., an "exit time") with activity levels above an exit threshold value (e.g., 10 Mpbs), the given modem 4 can send a request to the forwarder 16 for another mode change to the wideband mode. The forwarder 16 can respond to the request with another command that instructs the given modem 4 to change modes from the narrowband mode to the wideband mode. The exit time can be, for example, about 30 seconds to about 3 minutes or more. The exit time for transitioning from the narrowband mode to wideband mode can be less than for transitioning into the narrowband mode.

In the given example, during peak usage times, nearly all (or all) of the portions of the broadband connection at the access router 6 can be utilized by the N number of modems 4. Additionally or alternatively, in such peak times, nearly all (or all) of the channels that can be allocated by the forwarder 16 can be allocated to the N number of modems 4. In either situation (or both situations), the access router 6 can include time periods during such network congestion, which time periods can be referred to as "congested time". Stated differently, congested time can indicate that the access router 6 is exercising congestion in a network link. In some examples, the network link can include a data flow between the access router 6 and a device connected to one of the M number of modems 4, which device (e.g., a computer) can be referred to as customer premise equipment (CPE). In this situation, a subset of M number of the N number of modems 4 can be operating in the narrowband mode, where M is an integer between 1 and N−1. The subset of modems operating in the narrowband mode can be referred to as "the narrowband subset" (or a "lower bandwidth subset", in some examples). Accordingly, each modem 4 in the narrowband subset of modems 4 can be operating with a 1×1 connection.

In another situation in the given example, all (or nearly all) of the bandwidth of a downstream channel (or channels) is being allocated to the N number of modems 4 and at least one of the M number of modems 4 (operating in the narrowband mode) can be receiving data via the downstream channel. In this situation, there can be other channels available if the at least one of the M number of modems 4 were to be operating in the wideband mode.

The access router 6 can include a precondition detector 20 that can detect a precondition state that can indicate that at least one of the narrowband subset of modems 4 may benefit from a change in its bandwidth mode. The precondition state can include, for example, detecting a congested time and detecting that at least one modem 4 is operating in the narrowband mode during such time. Information about whether each modem 4 is operating in a narrowband mode or a wideband mode can be provided by the forwarder 16.

In the given example, a node (e.g., a computer or other network ready device) coupled to a given modem 4 of the narrowband subset of the modems 4 can initiate a download of a relatively large file that would (during non-congested time) cause the given modem 4 to exceed the exit threshold for the exit time. In the given example, it is presumed that the access router 6 has nearly reached (or reached) the maximum bandwidth of the broadband connection for a given set of channels. Accordingly, the given modem 4 may get "stuck" in the narrowband mode, since the maximum available bandwidth for the given set of channels at the access router 6 may act as a bottleneck of given modem 4, thereby preventing the given modem 4 from exceeding the exit threshold for the exit time. In such a situation, the precondition detector 20 can signal a flow ranking controller 22 to indicate that the narrowband subset of one or more modems 4, including the given modem, needs to be evaluated for switching bandwidth modes.

In response, a flow ranking controller 22 of the access router 6 can evaluate a data flow (e.g., a transmission control protocol (TCP) flow or other type of data flow) of the given modem 4 to determine if the given modem 4 should have its bandwidth mode 18 change from the narrowband mode to the wideband mode. The data flow can include a data stream provided from or provided to the given modem 4, such as data for a downloaded file, a webpage, streaming video or the like. The flow ranking 22 controller can evaluate a data flow of each of the narrowband subset of modems 4 to determine which (if any) of the narrowband subset of modems 4 is likely to benefit from changing bandwidth modes. Moreover, in some examples, each of the narrowband subset of modems 4 can have multiple data flows to evaluate. An amount by which each data flow would benefit from its modem changing bandwidth modes can be ascertained by the flow ranking controller 22 and utilized to rank the data flows in order, such as can be stored as a ranked list of data flows for each of the narrowband subset of modems 4. As used herein, the term "rank" does not require or exclude the employment of a hierarchical and/or priority based rating of the data flows. For instance, in some examples, the "ranking" of the data flows can define a simple categorical relationship. In other examples, as explained herein, the "ranking" of the data flows can be a sorted order of data flows that characterizes a level of priority associated with each of the data flows, such as may be based on the extent to which each data flow would benefit from a mode change.

The flow ranking controller 22 can determine the order in the rank list, for example, by evaluating a throughput of each data flow associated with the narrowband subset of modems and determining a relative proximity each throughput to the exit threshold. For instance, a data flow that has a throughput of about 100 kilobits per second (kbps) less than the exit threshold could have a lower ranking in the ranking list than a data flow that has a throughput of about 1 Mbps less than the exit threshold. In some examples, the flow ranking controller 22 can omit a particular data flow from the ranking list if the particular data flow has a throughput below a predetermined threshold value.

The flow ranking controller 22 can include a flow excluder 24 that can implement exclusion criteria. Exclusion criteria implemented by the flow excluder 24 can be implemented as a set of rules that define criteria, wherein if a given data flow meets the exclusion criteria that given data flow is to be excluded from further consideration for changing bandwidth modes of the associated modem 4. Stated differently, if the given data flow meets the exclusion criteria, no further analysis of the given data flow is needed to determine if the modem 4 associated with the given data flow is to be changed from the narrowband mode to the wideband mode (e.g., the given data flow is excluded). For example, each data flow meeting the exclusion criteria can be utilized to remove the data flow or its associated modem from the ranked list of the narrowband subset of modems. Stated differently, a modem 4 associated with an excluded data flow is unlikely to fully utilize additional bandwidth allocated to the modem 4, such that the modem 4 associated with the given data flow can be excluded to increase efficiency of the flow ranking controller 22.

By way of example, the exclusion criteria can include the existence of buffer bloat, the presence of a high error rate, the presence of a congestion indictor in the given data flow, the status of a window size, a status of connection attempts (and/or a data rate) to an associated server or the like. For example, buffer bloat can occur in the network 8 when excess buffering of packets inside the network causes high latency, jitter, as well as reduce the overall network throughput. The flow excluder 24 can generate a non-excluded list of the data flows that can be provided to a flow tester 26 of the flow ranking. Such non-excluded list, for example, can include the data flows remaining on the ranked list of the data flows.

The flow tester 26 can evaluate the non-excluded data flows in the narrowband subset to determine if an associated modem 4 is likely to benefit from being switched from narrowband mode to the wideband mode. There can be any number of flow tests by the flow tester 26, which may be set by the access router 6 designer or be user programmable tests. For example, a first flow test implemented by the flow tester 26 can include a temporary grant of additional bandwidth to a given data flow to determine if the increase in bandwidth increases the transmission rate of the data flow. If increasing the bandwidth increases the transmission rate of the given data flow, the flow tester 26 can add the modem 4 associated with the given data flow to a list of modems 4 that are likely to benefit from switching from the narrowband mode to the wideband mode. It is noted that if increasing the bandwidth of the given data flow does not increase the transmission rate of the given data flow, the temporary grant of additional bandwidth can be revoked.

A second example of a flow test implemented by the flow tester 26 can evaluate a manifest file of a given data flow that includes an adaptive bit rate (ABR). For instance, if the manifest file indicates that at least one available video bit rate is greater than a currently observed bandwidth, then the given data flow may benefit from increased bandwidth. In this situation, the flow tester 26 can add the modem 4 associated with the given data flow to the list of modems 4 that are likely to benefit from switching from the narrowband mode to the wideband mode. A third example of a flow test implemented by the flow tester 26 can be a monitor of user datagram protocol (UDP) packet drops. If the access router 6 is consistently dropping UDP packets, the flow tester 26 can add the modem 4 associated with the given data flow to the list of modems 4 that are likely to benefit from switching from the narrowband mode to the wideband mode.

A fourth example of a flow test implemented by the flow tester 26 can be an adjustment of the exit threshold for a selected subset of (all or some portion of) the narrowband subset of the modems 4. To initiate the fourth test, the flow tester 26 can set a provisional exit threshold that is lower than the exit threshold on the N number of modems 4. The flow tester 26 can add modems 4 associated with non-excluded data flows that exceed the provisional exit threshold to the list of modems 4 that are likely to benefit from being switched from the narrowband mode to the wideband mode.

The flow ranking controller 22 can employ heuristics to evaluate the list of modems 4 that are likely to benefit from being switched from the narrowband mode to the wideband mode to determine a switch list. The switch list thus can be a subset of the modems 4 in the list of modems 4 likely to benefit from being switched from the narrowband mode to the wideband mode. The selection of which the switch list can be based, for example, on an operation history of each modem 4 in the list of modems 4 likely to benefit from being switched from the narrowband mode to the wideband mode. The flow tester 26 can further be configured to quantify an amount by which each data flow would benefit from its modem changing bandwidth modes for each of the one or more flow tests that are performed, which can be used (e.g., by the flow ranking controller 22) to sort the list of data flows. For instance the list of data flows can be sorted to provide a ranked switch list that specifies an order by which each of the data flows might benefit from changing bandwidth modes. The flow ranking controller 22 can provide the switch list to the forwarder 16. In response, the forwarder 16 can provide a command (e.g., a DBC message or other command) to each modem 4 in the switch list to cause each respective modem 4 to switch to the wideband mode.

It is noted that upon changing bandwidth modes to the wideband mode, the forwarder 16 can allocate additional channels to a given modem 4. Inclusion of the additional channels at the given modem 4 can statistically increase the likelihood that the given modem 4 will see an increase in throughput, even during a congested time, since the increase in the number of channels will provide additional pathways for data to flow to the given modem 4. Thus, even during congested time, the given modem 4 can experience a higher throughput.

Figure 2:
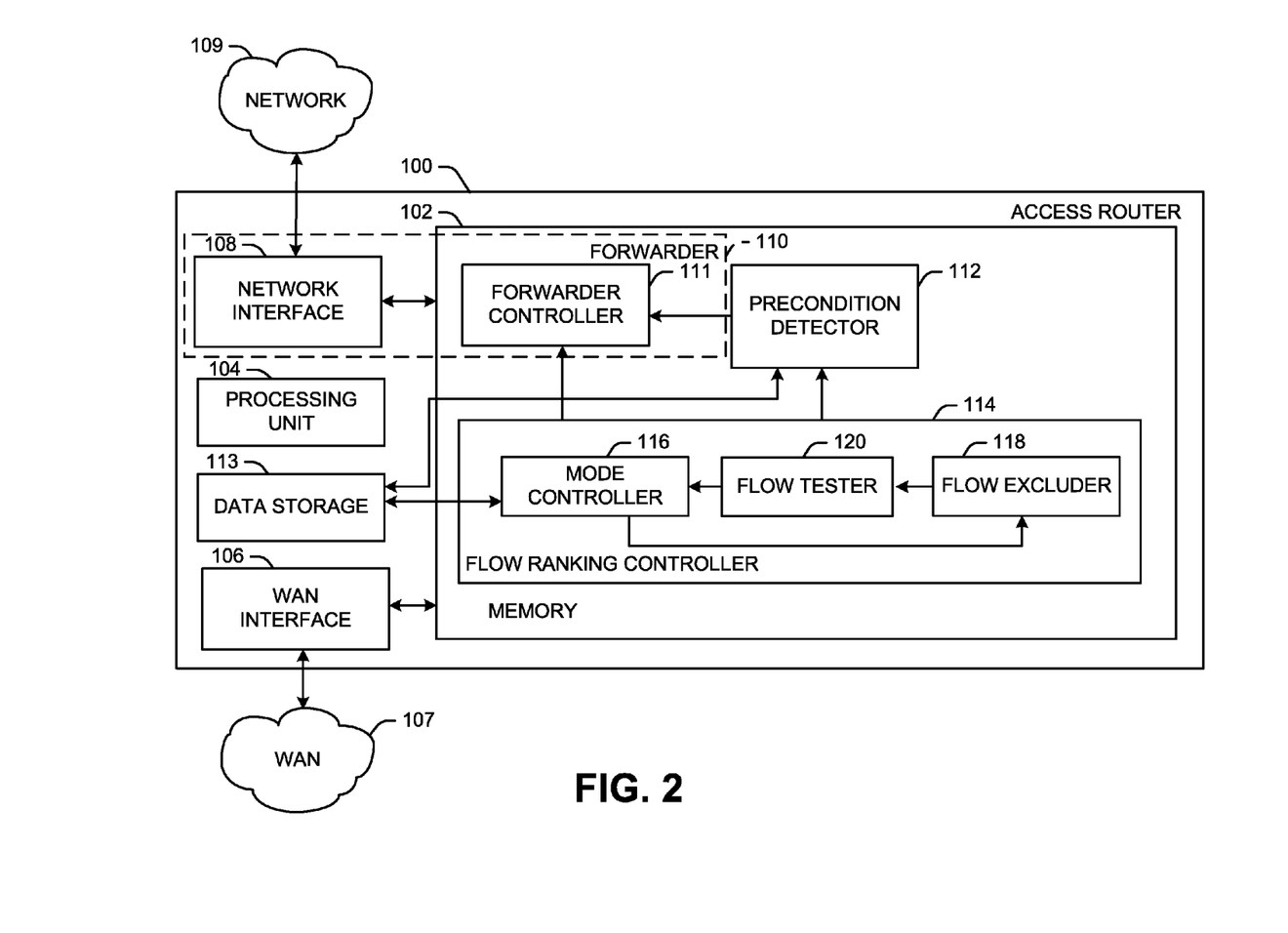
FIG. 2 illustrates an example of a modem termination system.

FIG. 2 illustrates an example of an access router 100, such as can be employed to implement the access router 6 illustrated in FIG. 1. The access router 100 can include a memory 102 to store machine readable instructions. The memory 102 could be implemented, for example, as a non-transitory computer readable medium, such as random access memory (RAM), flash memory, a hard drive or a combination thereof. The access router 100 can also include a processing unit 104 (e.g., a processor core) that can access the memory 102 and can execute the machine-readable instructions.

The access router 100 can include a WAN interface 106 connected to a WAN 107 (e.g., the Internet). The WAN interface 106 could be implemented, for example, as a network interface card or multiple network interface cards configured to provide for a broadband connection with the WAN 107. Similarly, the access router 100 can include a network interface 108 coupled to a network 109 (e.g., a subscriber network) that is coupled to N number of modems. The network interface 108 could be implemented, for example, on a forwarder 110. The access router 100 can provide data over the network 109 to each of the N number of modems (e.g., the modems 4 of FIG. 1). The connection to the WAN 107 can be referred to as a broadband connection and can be a multichannel connection, such as a 1 Gigabit per second (Gbps) upstream and 1 Gbps downstream connection. Other data rates could be implemented.

The access router 100 can be a rack mount system with a plurality of cards that perform different functions, including those disclosed herein. Additionally or alternatively, the access router 100 can have some or all of the modules integrated together. The forwarder 110 can include a forwarder controller 111 that can be configured to allocate portions (e.g., channels) of the broadband connection to the N number of modems via the network 109. Each such portion can be referred to as a channel (e.g., a data channel). The forwarder 110 can be implemented, for example, as the edge router, such as a quadrature amplitude modulation (QAM) edge router or the like.

As one example, in the situation where the broadband connection is a 1 Gbps connection (both upstream and downstream), each channel can have a bandwidth of about 100 Megabits per second (Mbps). In such a situation, the forwarder 110 can be configured to allocate 200 different upstream channels and 200 different downstream channels among the N number of modems. That is, the forwarder 110 can be configured to allocate more upstream and downstream bandwidth to the N number of modems than the available bandwidth at the broadband connection, since many data flows associated with the N number of modems can be bursty in nature. As load requirements change, the access router forwarder 110 can dynamically update the assignment of the channels to the N number of modems in real time.

The access router 100 and the N number of modems can, in some examples, comply with the DOCSIS 3.0 standards. Accordingly, the forwarder 110 can be configured to control a bandwidth mode of each of a plurality of modems serviced by the access router 100. The bandwidth mode of a given modem a narrowband mode or a wideband (e.g. broadband) mode, such as disclosed herein. For example, while the given modem is in the wideband mode, the given modem can have any number of bonded channels assigned to the given modem. Conversely, in the narrowband mode, the given modem can be assigned a lower bandwidth 1×1 connection to limit the bandwidth allocated to the given modem and to conserve power.

Continuing with the given example explained with respect to FIG. 1, during peak usage times, nearly all (for all) of the portions of the broadband connection at the access router 100 can be utilized by the N number of modems. Additionally or alternatively, nearly all (or all) of a set of the channels at the network interface 108 can be allocated to the N number of modems, but another set of channels may be available for allocation. Either situation can be considered to be congested time. The access router 100 can include a precondition detector 112 that can detect the congested time. In this situation, a subset of M number of the N number of modems can be operating in the narrowband mode, where M is an integer greater than zero and less than N (e.g., 1 to N−1). This subset can be referred to as "the narrowband subset". Accordingly, each modem in the narrowband subset of modems can be operating with a 1×1 connection.

In the given example, a node (e.g., a computer or other customer premise equipment) coupled to a given modem in the narrowband subset of the modems can initiate streaming of a relatively large video stream that would (during non-congested time) cause the given modem to exceed the exit threshold for the exit time. In the given example, it is presumed that the access router 100 has nearly reached (or reached) the maximum bandwidth of the broadband connection and/or the forwarder 110 has allocated all (or nearly all)

of the set of the channels at the network interface 108 and that another set of channels is available for allocation at the network interface 108 by the forwarder 110. Accordingly, the given modem may get "stuck" in the narrowband mode, since the maximum bandwidth of the access router 100 may act as a bottleneck for the given modem, thereby preventing the given modem from exceeding the exit threshold for the exit time.

The precondition detector 112 can detect a precondition state that can indicate that at least one of the narrowband subset of modems may benefit from a change in an operation mode. The precondition state can be, for example, a plurality of rules. The precondition detector 112 can access a data storage 113 (e.g., a database or list) that includes a list of the narrowband subset of modems, such as can be determined by the forwarder 110. If there is a least one modem in the narrowband subset of modems, and that modem can change to the wideband mode a first precondition is met. A second precondition can be met only for a given modem during the congested time for the WAN 107 and/or the network 109, which second precondition can indicate that the access router 100 is experiencing network congestion. The precondition detector 112 can be configured to determine a third precondition in response to detecting a data flow associated with one of the narrowband subset of modems is below predetermined quality of service (QoS) and/or service level agreement (SLA) limits. In some examples, if all three preconditions are met, the precondition detector 112 can signal a flow ranking controller 114 of the access router 100. In response, the flow ranking controller 114 can be configured to test that the data flows associated with the narrowband subset of modems. In other examples, if at least two of the three preconditions are met, the precondition detector 112 can signal the flow ranking controller 114 that the data flows associated with the narrowband subset of modems are to be tested.

Figure 3:
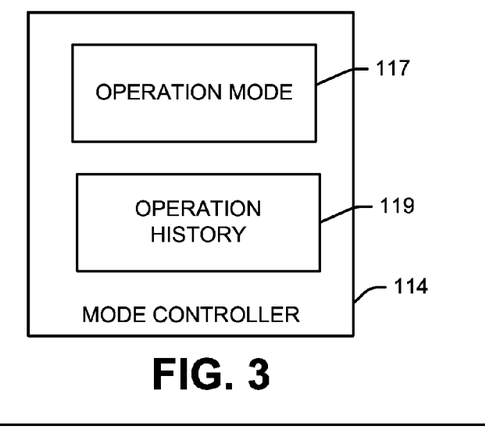
FIG. 3 illustrates an example of a mode controller illustrated in FIG. 2.

The flow ranking controller 114 can evaluate a data flow (e.g., a TCP flow, a UDP flow or other type of data flow) associated with a given modem of the narrowband subset of modems to determine if the given modem should have the bandwidth mode change from the narrowband mode to the wideband mode. The flow ranking controller 114 can also include a mode controller 116. FIG. 3 illustrates a detailed example of the mode controller 116 illustrated in FIG. 2. In some examples, the mode controller 116 can access the data storage 113 (e.g., a database and/or a list) that includes data that identifies an operation mode 117 of each of the N number of modems. Additionally or alternatively, the mode controller 116 can retrieve the operation mode 117 of each of the N number of modems from the forwarder 110. Thus, the flow ranking controller 114 can determine which of the data flows are to be evaluated based on the data specifying the mode of each modem and form a ranked list of data flows that can be sorted in an order corresponding to a likelihood that each data flow in the ranked list would benefit from additional bandwidth. The flow ranking controller 114 can determine the ranking in the ranked list, for example, based on proximity of a throughput of each data flow in the ranked list relative to the exit threshold. Moreover, data flows that have a throughput below a predetermined threshold value can be omitted from the ranked list, which can alleviate the need for further evaluation of such omitted data flows. The mode controller 116 can provide a list of modems corresponding to the data flows in the ranked list that are to be evaluated for a possible switch to the wideband mode to a flow excluder 118. The list of modems can omit modems that have been added to an exclusion list that can be based on an operation history 119 that can be determined by the mode controller 116 in a manner described herein.

Each data flow of a plurality of data flows on the network 109 can be data provided from or data provided to an associated modem, such as data for a downloaded file, a webpage, streaming video, or the like. The flow ranking controller 114 can evaluate a data flow associated with each of the narrowband subset of modems to determine which (if any) of the narrowband subset of modems is likely to benefit from changing bandwidth modes. Moreover, in some examples, each of the narrowband subset of modems may have multiple data flows to evaluate.

Figure 5:
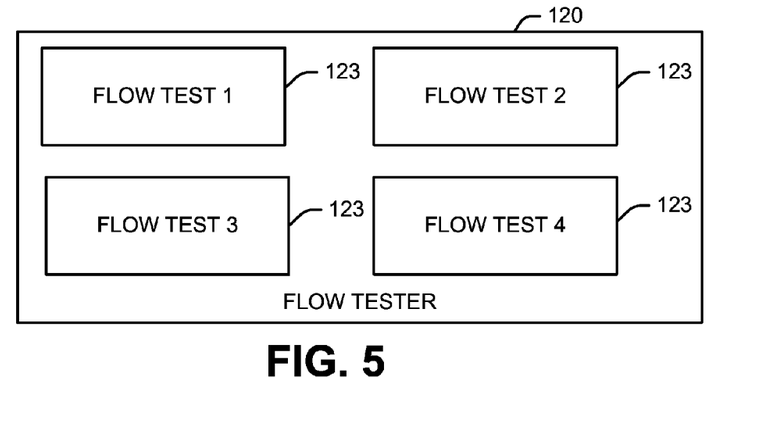
FIG. 5 illustrates an example of a flow tester illustrated in FIG. 2.

The flow ranking controller 114 can include a flow excluder 118. FIG. 5 illustrates a detailed example of the flow excluder 118 illustrated in FIG. 2. The flow excluder 118 can employ exclusion criteria on each data flow for modems included on the list of modems provided by the mode controller 116. The exclusion criteria can be implemented as a set of rules that define criteria, wherein if a given data flow meets the exclusion criteria that given data flow is to be excluded from further consideration for changing bandwidth modes of the associated modem. Stated differently, if the given data flow meets the exclusion criteria, no further analysis of the given data flow is needed to determine if the modem associated with the given data flow is to be converted from the narrowband mode to the wideband mode. Stated differently, a modem associated with an excluded data flow is unlikely to fully utilize additional bandwidth allocated to the modem, such that the modem associated with the given data flow can be excluded to increase efficiency of the flow ranking controller 114.

Figure 4:
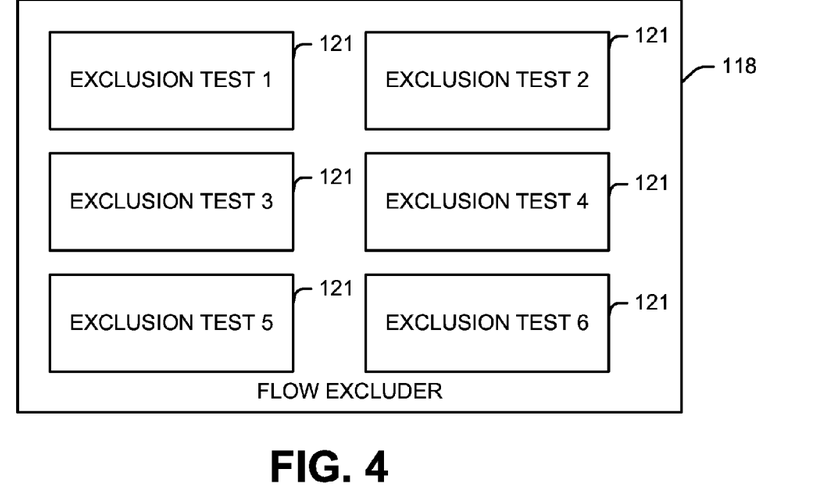
FIG. 4 illustrates an example of a flow excluder illustrated in FIG. 2.

The exclusion criteria can be implemented as a plurality of exclusion tests 121 on each data flow that is associated with one of the narrowband subset of modems. An example of an exclusion test 121 ("EXCLUSION TEST 1", as illustrated in FIG. 4) can be a determination of whether a given data flow is experiencing buffer float. To determine if the given data flow is experiencing buffer bloat, a packet latency of the given data flow can be examined. Buffer bloat can occur in a plurality of buffers that can exist in routers in between the access router 100 and the modem associated with the given data flow. During buffer bloat, the buffers of the routers between the access router 100 and the modem can be filled and discharged repeatedly. Such filling and discharging of buffers can cause a packet latency that can increase over time, and then decrease abruptly. Accordingly, by examining a packet latency of the given data flow, the presence of buffer bloat can be detected by the flow excluder 118. If the given data flow is experiencing buffer bloat, the given data flow can be excluded from further testing.

As a second example of an exclusion test 121 ("EXCLUSION TEST 2", as illustrated in FIG. 4), the flow excluder 118 can evaluate a bit error rate of a given data flow. The flow excluder 118 can determine the bit error rate, for example, by examining a header of packets in the given data flow to determine checksum errors in packets. Additionally or alternatively, the flow excluder 118 can evaluate forward error correction (FEC), cyclic redundancy check (CRC), checksum and/or other integrity check that is included with the packets of the given data flow. For example, the FEC can provide information characterizing an error count at a modem associated with the given data flow. If the flow excluder 118 determines that the given data flow has a relatively high bit error rate, the flow excluder 118 can exclude the given data flow from further testing.

As a third example of an exclusion test 121 ("EXCLUSION TEST 3", as illustrated in FIG. 4), the flow excluder 118 can evaluate a congestion indicator on a given data flow. In some examples, congestion may be indicated (e.g., within a packet header of data arriving at the network interface 108 of the access router 100 from the WAN 107) as occurring upstream from the access router 100 (e.g., between the access router 100 and a server coupled to the WAN 107). Since the congestion is upstream from the access router 100 (e.g., congestion exists from the server to the access router 100), an increase in bandwidth to the modem associated with the given data stream is unlikely to increase the throughput to the modem. Accordingly, if the flow excluder 118 determines that the given data flow is experiencing such congestion, the flow excluder 118 can exclude the given data flow from further testing.

As a fourth example of an exclusion test 121 ("EXCLUSION TEST 4", as illustrated in FIG. 4), the flow excluder 118 can evaluate a window size of a given data flow to determine if a given data flow should be excluded. The flow excluder 118 can determine window size, for example, by evaluating acknowledgement (ACK) packets received from an application (e.g., a client) operating on consumer premise equipment (CPE), such as a computer coupled to a modem and/or ACK packets received from an application (e.g., a server) operating on an external system (e.g., on the Internet) in the given data stream. A window size can indicate an amount of data a peer is willing to receive. In a typical client and server, data sent from the server to the client can contain a window that provides data characterizing an amount data the server can receive, which window can be referred to as an upstream window. Conversely, data sent from the client (e.g., at the CPE) to the server can contain a window that characterizes an amount of data the client can receive, which window can be referred to as a downstream window. For instance, the flow excluder 118 can determine if a downstream window size is relatively small. A small downstream window size can indicate that the application associated with the given data flow (e.g., the CPE) is consuming data at a rate slower than the data can be provided to the node. Accordingly, if the flow excluder 118 determines that the downstream window size is relatively small (e.g., relative to a predetermined threshold and over a predetermined timeframe), the flow excluder 118 can exclude the given data flow from further testing.

Furthermore, the flow excluder 118 can determine if the downstream window size is large (relative to another predetermined threshold), which can indicate that a receive buffer associated with the client (at the CPE) is empty (or nearly empty) for a predetermined period of time. This can indicate that a server stall may have occurred. Accordingly, if the flow excluder 118 determines that the downstream window size (e.g., the window size of the CPE) is large over the predetermined period of time, potentially indicating the client's receive buffer is empty and the server has stalled, the flow excluder 118 can exclude the given data flow from further testing.

In a fifth example of an exclusion test 121 ("EXCLUSION TEST 5", as illustrated in FIG. 4), the flow excluder 118 can evaluate health of a given server (e.g., an endpoint) associated with a given data flow. The flow excluder 118 can also evaluate data flows provided from the N number of modems to determine if any other modems (not associated with the given data flow) are connected to the given server to determine the health of the given server. The health of the given server can be based on an evaluation of reset packets (e.g., TCP RST), synchronize packets (e.g., TCP SYN) timeouts and/or application errors (e.g., an HTTP error 408). If the flow excluder 118 determines that the given server is unhealthy, the flow excluder 118 can exclude the given data flow from further testing.

In a sixth example of an exclusion test 121 ("EXCLUSION TEST 6", as illustrated in FIG. 4), the flow excluder 118 can also identify a given server (e.g., an endpoint) associated with a given data flow. The flow excluder 118 can also evaluate data flows provided from the N number of modems to determine if any other modems (not associated with the given data flow) are connected to the given server to determine an average data rate being provided by the given server. The data rate provided from the given server to modems in the narrowband subset can be compared to the data rate provided from the given server to modems operating in the wideband mode, which can be referred to as a "wideband subset". If an average data rate provided by the given server to modems in the narrowband subset is approximately equal to an average data rate being provided to modems in the wideband subset, the given server may be at or near a bandwidth limit. Thus, the flow excluder 118 can exclude the given data flow from further testing.

The flow excluder 118 can provide a list of data flows that are not excluded from further testing to a flow tester 120 of the flow ranking controller 114, which can be referred to as non-excluded data flows. FIG. 5 illustrates an example of a flow tester 120, such as can correspond to the flow tester 120 of FIG. 2. The flow tester 120 can be employed to evaluate the non-excluded data flows that are associated with the narrowband subset of modems. The evaluation by the flow tester 120 can be employed to determine, which, if any, of the modems associated with the non-excluded data flows are likely to benefit from a change in bandwidth modes from the narrowband mode to the wideband mode. In some examples, the flow tester 120 can be configured to estimate how much each of the data flows might benefit from a change in the bandwidth mode of its respective modem. The flow tester 120 can employ a number of tests on the non-excluded data flow, namely a given data flow. In some examples, the flow tester 120 can selectively apply one or more tests to each respective given data flow depending on the type of data flow and/or conditions of the data flow. Thus, the flow tester 120 can apply different tests to different data flows and/or different tests to the same data flow.

A first example of flow test 123 ("FLOW TEST 1", as illustrated in FIG. 5) can be employed to identify the access router 100 as a bottleneck by granting additional bandwidth to a modem associated with the given data flow. To implement the first test, the flow tester 120 can be configured to measure a downstream rate of the given data flow, $D_0$. The flow tester 120 can be configured to send a command to the forwarder controller 111 that causes the forwarder 110 to randomly (or semi-randomly) discard (e.g., drop) packets from other data flows, thereby freeing up bandwidth by a particular amount, $\Delta$ at the access router 100. The flow tester 120 can then send a command to the forwarder controller 111 to increase the bandwidth to the modem associated with the given data flow by $\Delta$ (the freed up amount of bandwidth).

The flow tester 120 can be configured to wait a predetermined amount of time for the data rate of the given data flow to adjust to the new bandwidth limit. The flow tester 120 can re-measure the downstream rate of the given data flow, $D_1$. The flow tester 120 can send a command to the forwarder controller 111 to cease discarding of the random packets. Moreover, the flow tester 120 can determine if $D_1 \approx (1+\Delta)*D_0$, which can indicate that the downstream data rate of the given data flow is limited by downstream congestion. Additionally, in the first test, the flow tester 120 can determine that the access router 100 is a bottleneck in situations where there are more upstream bandwidth requests for a data flow than can be granted by the forwarder 110. In either situation, the flow tester 120 can determine that the modem associated with the given data flow may benefit from being switched to the wideband mode.

A second example of a flow test 123 ("FLOW TEST 2", as illustrated in FIG. 5) can be implemented where a given (non-excluded) data flow has an adaptive bit rate (ABR) and contains unencrypted data. The given data flow can have an ABR, in examples where the given data flow is streaming video and/or audio. In such a situation, the flow tester 120 can be configured to snoop a manifest file of the given data flow that can provide information that characterizes available bit rates of an ABR profile set. The flow tester 120 can determine if the manifest file lists a manifest bit rate greater than a measured bit rate of the given data flow. For example, if the data flow is a video stream, the measured bit rate could be a lowest bit rate for a standard definition video stream and the manifest rate could be a bit rate for a high definition video stream. If the access router 100 can support the manifest bit rate in wideband operation, including considerations of quality of service (QoS) parameters, rich communication services (RCS) profiles, or the like and the modem associated with the given data flow is authorized to receive data at the increased bit rate, the flow tester 120 can determine that the modem associated with the given data stream may benefit from being switched to the wideband mode.

In a third example of a flow test 123 ("FLOW TEST 3", as illustrated in FIG. 5), the flow tester 120 can monitor drops by the access router 100 of specific types of packets, such as user datagram protocol (UDP) packets of a given data flow. A dropped UDP packet can indicate that the modem associated with the given data flow may benefit from being switched to the wideband mode.

Additionally, in a fourth example of a flow test 123 ("FLOW TEST 4", as illustrated in FIG. 5), the flow tester 120 can determine that available bandwidth of the broadband connection to the access router 100 is less than the difference between the exit threshold and a current data rate of a given data flow. For instance, if the available bandwidth is 1 Mbps and the current data rate of the given data flow is 6 Mbps while the exit threshold is 9 Mbps, the flow tester 120 can determine that under the current conditions, the modem associated with the given data flow will not exceed the exit threshold, thereby preventing the modem from changing to the wideband mode. In this situation, the flow tester 120 can set a provisional exit threshold value that is lower than the exit threshold value in the N number of modems. If non-excluded data flows associated with modems in the narrowband subset meet the provisional exit threshold value, the flow tester 120 can determine that these modems may benefit from being switched to the wideband mode.

The flow tester 120 can provide the mode controller 116 with a list of modems that are likely to benefit from being switched to the wideband mode from the narrowband mode. The mode controller 116 can employ heuristics based on the operating history 119 of each modem in the list of modems that are stored in the data storage 113 to determine which modems (if any) are to be switched to the wideband mode. Such heuristics can be leveraged to determine that data flows are limited by an element other than the access router 100, such as a router downstream to the access router 100 on the network 109. Additionally, the operating history 119 of each modem can indicate if in the past, a particular modem consistently switched back to the narrowband mode relatively quickly after being switch to the wideband mode (e.g., a gratuitous wake-up). Such statistics could be employed, for example by the mode controller 116 to generate and modify the exclusion list of modems, wherein modems in the exclusion list are not monitored in the manner described herein.

Additionally, the mode controller 116 can track statistics as to which of the tests employed by the flow tester 120 is employed to identify modems that are likely to benefit from being switched to the wideband mode. These statistics could be employed, for example, to identify which of the flow tests of the flow tester 120 and/or the exclusion tests of the flow excluder 118 may benefit from parameter tweaking.

Based on the heuristics, the mode controller 116 can form a list of modems that are to be switched from the narrowband mode to the wideband mode, which can be referred to as a switch list. The switch list can be a complete list of the modems that would benefit from the mode change. In other examples, the list can include a proper subset of the modems, which can include those modems that the mode controller has determined would experience a greatest relative benefit from the mode change. This determination can be based on the heuristics explained herein and/or based on the results of flow tests 123 implemented by the flow tester 120. The switch list can be provided to the forwarder controller 111. In response, the forwarder controller 111 can provide a command (e.g., a DBC message) via the network interface 108 to each modem in the switch list to causes each respective modem to switch to the wideband mode.

Upon changing bandwidth modes to the wideband mode, the forwarder 110 can allocate additional bandwidth to a given modem. In some examples, the forwarder controller 111 can allocate additional channels to the given modem to allocate the additional bandwidth for the modem. In other examples, the forwarder controller can change quality of service (QoS) parameters for the given modem to allocate the additional bandwidth for the given modem. Additionally or alternatively, data flows associated with the given modem (in the wideband mode) are given a higher priority than data flows associated with a modem in the narrowband mode. Thus, even during congested time, the given modem can experience a higher throughput. Moreover, the access router 100 can prevent the modems from becoming "trapped" in the narrowband mode during congested time.

In view of the foregoing structural and functional features described above, example methods will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples be repeated, occur in different orders and/or concurrently from that shown and described herein. Moreover, it is not necessary that all described actions be performed to implement a method.

Figure 6:
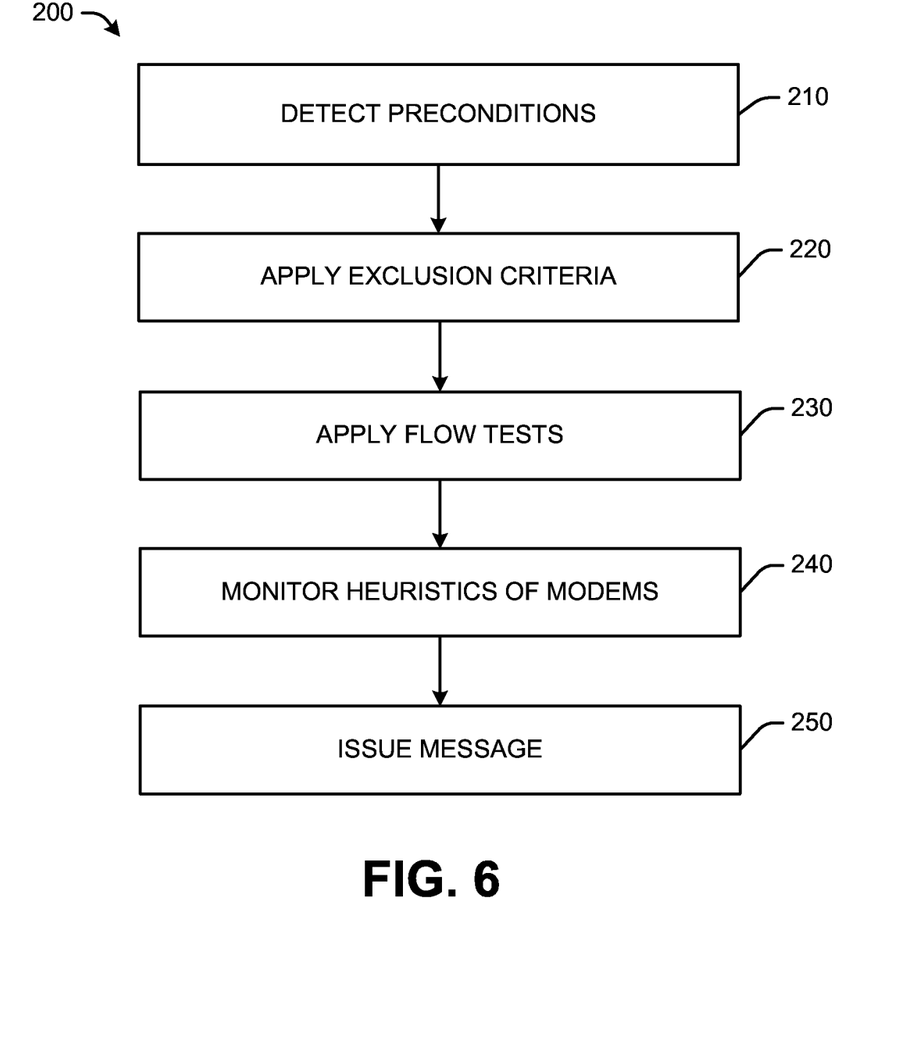
FIG. 6 illustrates a flowchart of an example method for controlling a bandwidth mode of modems.

FIG. 6 illustrates a flowchart of an example of a method 200, such as can be implemented by an access router (e.g., the access router 6 illustrated in FIG. 1 and/or the access router 100 illustrated in FIG. 2). In such a situation, the access router can communicate with N number of cable (e.g., the modems 4) modems over a network. At 210, a determination can be made (e.g., by precondition detector 112 of FIG. 2) as to whether a set of preconditions have been met. The preconditions can include, but are not limited to a combination of detecting (i) a subset of N number of modems, namely a narrowband subset are operating in narrowband mode and are capable of operating in a wideband mode, (ii) the access router is experiencing congestion time at a broadband connection to a WAN and/or the access router is experiencing congestion time a downstream network and (iii) at least one data flow associated with a modem in the narrowband subset is below QoS and/or SLA limits.

At 220, exclusion criteria can be applied (e.g., by the flow excluder 118 of FIG. 2) on data flows associated with the narrowband subset. The exclusion criteria can be based on, for example, the first through eight exclusion criteria tests explained with respect with FIG. 2 to determine a list of non-excluded data flows.

At 230, one or more flow tests can be applied (e.g., by the flow tester 120 of FIG. 2). For instances, the tests can be applied as a series of tests (e.g., the first through fourth flow tests applied by the flow tester 120 with respect to FIG. 2) to the non-excluded data flows to determine which of the narrowband subset of the modems is likely to benefit from being switch into the wideband mode. The tests can be applied differently to different data flows, such as depending on the type of data flow and/or one or more of its detected conditions.

At 240, heuristics can be applied (e.g., by the mode controller 116 of FIG. 2) to each of the modems deemed likely to benefit from being switched to the wideband mode based on the results of the flow test. The heuristics can be employed to generate a switch list. At 250, the switch list can be employed (e.g., by the forwarder controller 111) to generate a command (e.g., a DBC message or other message) that causes one or more of the modems on the switch list to switch to the wideband mode.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a precondition detector configured to detect congestion at a network link; and
   a flow ranking controller to operate in response to detecting the congestion at the network link, the flow ranking controller comprising:
      a flow excluder configured to apply exclusion criteria to a plurality of data flows through the network link associated with respective modems that are operating in a lower bandwidth mode and to generate a list of non-excluded data flows; and
      a flow tester configured to apply flow tests to the non-excluded data flows to determine which of the respective modems is likely to benefit from being switched from the lower bandwidth mode to a higher bandwidth mode.

2. The system of claim 1, wherein the flow ranking controller further comprises a mode controller configured to generate a switch list that includes a subset of the modems that are determined to be likely to benefit from being switched to the higher bandwidth mode.

3. The system of claim 2, wherein the mode controller is configured to provide the switch list to a forwarder, wherein the forwarder sends a command to each modem on the switch list to switch from the lower bandwidth mode to the higher bandwidth mode.

4. The system of claim 3, wherein the mode controller is configured to generate the switch list based on heuristics that include an operating history of the modems that are determined to be likely to benefit from being switched to the higher bandwidth mode.

5. The system of claim 1, wherein the exclusion criteria includes an exclusion test for buffer bloat observed by each of the plurality of data flows, the flow excluder configured to apply the exclusion test for buffer bloat to determine whether to exclude a respective data flow based on a level of the buffer bloat detected for the respective data flow associated with each modem.

6. The system of claim 1, wherein the exclusion criteria includes an exclusion test for network congestion observed by each of the plurality of data flows, the flow excluder configured to apply the exclusion test for network congestion to determine whether to exclude a respective data flow based on the network congestion exceeding a threshold for the respective data flow.

7. The system of claim 1, wherein the exclusion criteria includes an exclusion test for at least one of a small window size for an application associated with at least one of the respective modems, and a large window size for the application, wherein the window size defines an amount of data that the application is configured to receive, and wherein the flow excluder is configured to determine whether to exclude the given data flow based on the detection of at least one of the small window size for the application, and the large window size for the application.

8. The system of claim 1, wherein the exclusion criteria includes an exclusion test for a health of a server associated with a given data flow of the plurality of data flows, the flow excluder configured to apply the exclusion test for server health to determine whether to exclude a respective data flow based on an indication that the server is unhealthy.

9. The system of claim 1, wherein the flow tester is configured to set a provisional exit threshold value lower than an exit threshold value at each modem associated with the plurality of data flows, wherein the exit threshold defines a minimum throughput for the each modem to request a switch from the lower bandwidth mode to the higher bandwidth mode.

10. A system comprising:
   a first network interface connected to a wide area network via a broadband connection;
   a second network interface connected to a plurality of modems;
   a forwarder configured to allocate bandwidth to each of the plurality of modems, wherein a lower bandwidth subset of the plurality of modems operate in a lower bandwidth mode;
   a precondition detector configured to detect network congestion in at least one of the first network interface and the second network interface; and
   a flow ranking controller configured to rank a plurality of data flows in response to the precondition detector detecting the network congestion, the flow ranking controller comprising:
      a flow excluder configured to apply exclusion criteria to the plurality of data flows associated with respective modems of the lower bandwidth subset of the plurality of modems to generate a list of non-excluded data flows;
      a flow tester configured to apply at least one flow test to the non-excluded data flows to determine which of the respective modems is likely to benefit from being switched to a higher bandwidth mode; and a mode controller to provide a switch list that includes a list of modems in the lower bandwidth subset of the plurality of modems that have been determined to likely benefit from being switched to the higher bandwidth mode;

wherein the forwarder is configured to command at least one of the modems to switch to the higher bandwidth mode based on the switch list.

11. The system of claim 10, wherein the mode controller is configured to apply heuristics, based on an operating history of each of the plurality of the modems that have been determined to be likely to benefit from being switched to the higher bandwidth mode, to determine the switch list.

12. The system of claim 11, wherein the mode controller is configured to maintain an exclusion list that excludes a set of modems from the flow ranking controller.

13. A method comprising:

detecting network congestion in a router system;

applying exclusion criteria to a plurality of data flows to generate a list of non-excluded data flows in response to detecting the network congestion, wherein each of the plurality of data flows is associated with a respective modem operating in a lower bandwidth mode; and applying flow tests to each of the non-excluded data flows to determine which of the modems operating in the lower bandwidth mode is likely to benefit from being switched to a higher bandwidth mode.

14. The method of claim 13, further comprising monitoring heuristics of each of the plurality of modems operating in the lower bandwidth mode that is determined to likely benefit from being switched to the higher bandwidth mode to generate a switch list.

15. The method of claim 14, further comprising commanding each of the plurality of modems identified in the switch list to switch to the higher bandwidth mode.

16. A method comprising:

detecting, by a precondition detector, congestion at a network link; and in response to detecting the congestion at the network link, applying, by a flow excluder in a flow ranking controller, exclusion criteria to a plurality of data flows through the network link associated with respective modems that are operating in a lower bandwidth mode and to generate a list of non-excluded data flows, and applying, by a flow tester in the flow ranking controller, flow tests to the non-excluded data flows to determine which of the respective modems is likely to benefit from being switched from the lower bandwidth mode to a higher bandwidth mode.

17. The method of claim 16, generating, by a mode controller in the flow ranking controller, a switch list that includes a subset of the modems that are determined to be likely to benefit from being switched to the higher bandwidth mode.

18. The method of claim 16, wherein applying the exclusion criteria comprises applying the exclusion criteria including an exclusion test for buffer bloat observed by each of the plurality of data flows, the flow excluder configured to apply the exclusion test for the buffer bloat to determine whether to exclude a respective data flow based on a level of the buffer bloat detected for the respective data flow associated with each modem.

* * * * *